United States Patent
Allen et al.

(10) Patent No.: US 6,830,607 B2
(45) Date of Patent: Dec. 14, 2004

(54) SLURRY TRAY AND SLURRY TRAY ASSEMBLY FOR USE IN FRACTIONATION TOWERS

(75) Inventors: Jeffrey L. Allen, Calvert City, KY (US); Timothy B. Baker, Paducah, KY (US)

(73) Assignee: Westlake Technology Corporation, Houston, TX (US)

( * ) Notice: Subject to any disclaimer, the term of this patent is extended or adjusted under 35 U.S.C. 154(b) by 17 days.

(21) Appl. No.: 10/172,228

(22) Filed: Jun. 14, 2002

(65) Prior Publication Data

US 2003/0015094 A1 Jan. 23, 2003

Related U.S. Application Data

(60) Provisional application No. 60/298,690, filed on Jun. 15, 2001.

(51) Int. Cl.[7] .............................................. B01D 19/00
(52) U.S. Cl. .................... 95/263; 96/202; 261/114.5
(58) Field of Search .......................... 95/263, 264, 265; 96/202; 525/500, 501, 502; 261/114.1, 114.5, 114.4, 114.3

(56) References Cited

U.S. PATENT DOCUMENTS

| | | | |
|---|---|---|---|
| 1,738,870 A | | 12/1929 | Cox et al. |
| 1,782,735 A | | 11/1930 | MacKenzie |
| 2,582,826 A | | 1/1952 | Glitsch |
| 2,713,478 A | * | 7/1955 | Ragatz |
| 2,926,754 A | * | 3/1960 | Ragatz |
| 3,053,521 A | * | 9/1962 | Plaster et al. |
| 3,062,517 A | | 11/1962 | Voetter et al. |
| 3,362,696 A | * | 1/1968 | Vaughan |
| 3,717,553 A | * | 2/1973 | Otsuki et al. |
| RE27,908 E | | 1/1974 | Nutter et al. |
| 3,926,927 A | * | 12/1975 | Stookey |
| 4,007,022 A | * | 2/1977 | Schleicher et al. |
| 4,171,427 A | * | 10/1979 | Ohoridnik et al. |
| 4,184,857 A | * | 1/1980 | Iijima et al. |
| 4,201,628 A | * | 5/1980 | Church et al. |
| 4,228,273 A | * | 10/1980 | Hughes |
| 4,282,348 A | * | 8/1981 | Wada et al. |
| 4,303,479 A | * | 12/1981 | Church et al. |
| 4,369,092 A | * | 1/1983 | Nakano et al. |
| 4,442,048 A | * | 4/1984 | Abernathy et al. |
| 4,483,747 A | | 11/1984 | Aruga et al. |
| 4,510,023 A | | 4/1985 | Bennett et al. |
| 4,547,326 A | * | 10/1985 | Weiler |
| 4,673,464 A | * | 6/1987 | Zeitsch |
| 5,468,425 A | | 11/1995 | Nutter |
| 5,480,595 A | | 1/1996 | Yeoman et al. |
| 5,804,039 A | * | 9/1998 | Kurazono et al. |
| 5,895,608 A | | 4/1999 | Lee et al. |
| 6,270,729 B1 | * | 8/2001 | Perner et al. |
| 6,332,958 B1 | * | 12/2001 | Matsuda et al. |
| 6,375,793 B1 | * | 4/2002 | Uchida et al. |
| 6,588,736 B1 | * | 7/2003 | Chuang et al. |
| 2003/0015094 A1 | * | 1/2003 | Allen et al. |

* cited by examiner

*Primary Examiner*—Duane S. Smith
(74) *Attorney, Agent, or Firm*—Bracewell & Patterson, LLP

(57) ABSTRACT

A slurry tray and a method for removing residual vinyl chloride monomer from a polyvinylchloride resin slurry with reduced discoloration of the polyvinylchloride resin is provided. The slurry tray preferably includes partitioned channels that cause the slurry to flow at a velocity that maintains solids contained with the slurry in a liquid suspension and weirs contains holes to allow solids trapped at the bottom of the weir to flow continuously downward to a bottom of the plate tower for removal from the tower. The method preferably includes supplying the slurry towards the top of the tower and a vapor towards the bottom of the tower. The slurry descends the tower, while the steam simultaneously ascends the tower, both through directional valves. The solids trapped upon the surface of the trays travel down the tower through the holes within the weirs for removal from the tower.

21 Claims, 14 Drawing Sheets

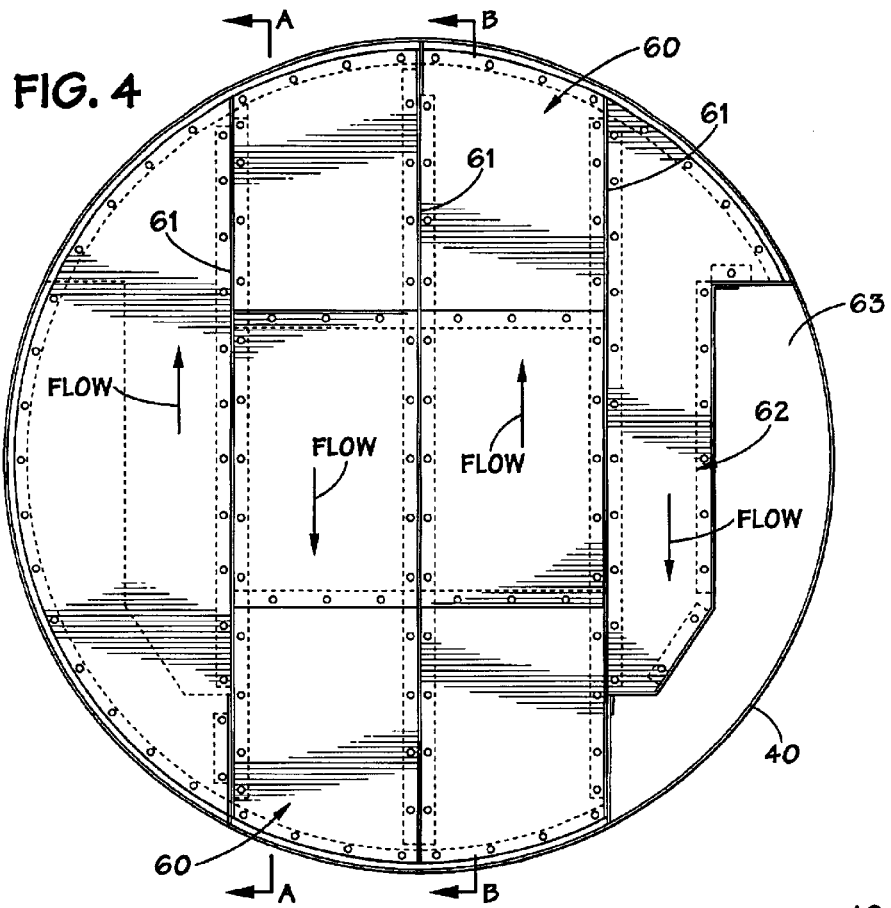
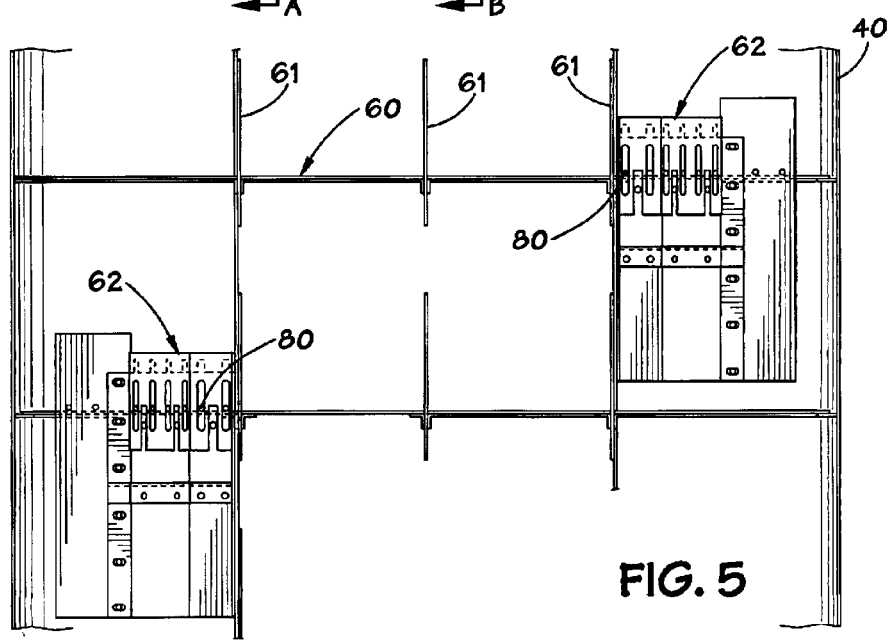

SLURRY TRAY AND SLURRY TRAY ASSEMBLY FOR USE IN FRACTIONATION TOWERS

RELATED APPLICATIONS

This application claims the benefit of U.S. Provisional Patent Application Ser. No. 60/298,690, filed on Jun. 15, 2001.

BACKGROUND OF THE INVENTION

1. Field of the Invention

The invention relates to polyvinylchloride ("PVC") slurry being stripped in a column, or fractionation column, to remove residual vinyl chloride, and the PVC slurry passes over a plurality of slurry trays, while a vapor stream is directly injected into the bottom of the column.

2. Description of Related Art

In the production of PVC resin, vinyl chloride monomer is removed from a slurry of vinyl chloride resin by blowing, or passing, steam into a slurry of the resin while the resin flows down through the column, thus stripping off remaining monomer together with generated water vapor, as is known in the art. The fractionation tower, or column, or plate tower, as they are called in the art, contains a plurality of trays over which the slurry passes, beginning at the top of the tower until the slurry exits the bottom of the tower.

A major problem in the production of the PVC resin is that the PVC resin can discolor if it spends an extended period of time in the column. The solid particles can settle out on the trays and stay in the column exposed to elevated temperatures, at which time the particles can discolor. Whenever the slurry feed to the column stops, or the column's operation is upset, the discolored particles can exit the column and contaminate the product. A disadvantage in many tray columns presently being used is that the velocity of the slurry is not sufficient to maintain the solid resin particles in suspension at all times.

Accordingly, it would be advantageous to have a slurry tray and a slurry tray assembly for use in fractionation towers wherein the velocity of the slurry is maintained, so that the solids will be maintained in suspension at all times as the slurry passes through the multiple trays.

SUMMARY OF THE INVENTION

In accordance with the invention, the foregoing advantage have been achieved through the present slurry tray and slurry tray assembly, or plate tower, for use in fractionation towers. The slurry trays of the present invention maintain a plug flow regime, whereby all the solid particles are exposed to the same residence time and temperature, within the column, as all other particles. Thus, discoloration of the PVC resin particles does not occur.

The slurry trays are designed with partitions, or baffles, that guide, or force the slurry to flow in channels formed upon each individual slurry tray. The channels are designed whereby the velocity of the flow is always greater than the velocity required to maintain the solids in suspension. Weirs are provided that have holes formed in the bottom of the weirs, so that the solid resin particles will not be trapped at the bottom of the weir. The holes, or openings, provide passageways through which the solid particles can pass, thus constantly flowing from tray to tray, and eventually out of the fractionation, or distillation, column. The openings provide for the solid particles not becoming trapped upon a particular tray and not passing to the next lower level, or next lower tray, in the column.

The trays of the present invention are designed to fit into a standard distillation column, or fractionation tower, or any similar structure. In each embodiment of the present invention, the trays can be provided with directional valves, which are pointed in the direction of the flow of the slurry along the tray, which assists in keeping the solid particles in suspension. The tray preferably has no horizontal surfaces on the supporting structures where solids can accumulate.

The baffle disposed upon the trays preferably channels the flow of the slurry so as to maintain the velocity of the slurry at above approximately one foot per second. This preferred velocity ensures plug flow velocity so that each particle is exposed to the same residence time and the same temperature history for each embodiment of the present invention.

The holes in the lower portion of the weirs preferably pass approximately one-fourth of the minimum flow into a downcomer and to the tray disposed below each weir. Thus, no solid particles will be trapped at the bottom of the weir and there is always a constant flushing of the weir along the bottom of the weir.

The downcomer in the column does not have any dead spaces, whereby plug flow preferably always occurs in the downcomer. The downcomer of each tray provides minimum space between the weir and the wall of the column, but also provides a large enough volume and weir length to ensure proper operation of the downcomer.

A feed nozzle is provided above the topmost slurry tray, and the feed nozzle is configured to provide no dead spaces and constant plug flow occurring in the topmost downcomer. Mini-jet tabs can also be provided in the surface of each tray to provide extra push, or velocity, to the slurry in low velocity regions of the trays. The height of the weirs of each tray is adjustable to increase, or decrease, the residence time of the slurry in the column.

The slurry tray and slurry tray assembly of the present invention are particularly useful in stripping slurry streams containing solids in concentrations up to thirty-five percent; however, these trays can also be useful for stripping any substance, other than PVC slurries, that has high solids contents.

The present invention also advantageously provides a method of removing residual vinyl chloride monomer from a PVC resin slurry so that the PVC resin is not discolored. The method generally includes supplying a PVC resin slurry to a slurry tray in a plate tower. The PVC resin slurry is allowed to flow through partitioned channels downwardly through a plurality of apertures, or openings, within the slurry tray and a downcomer of the slurry tray to a next slurry tray. The PVC resin slurry preferably travels at a velocity greater than that required to maintain solids contained within the PVC resin slurry in liquid suspension.

A vapor stream is also supplied to the plate tower preferably at a lower feed location than the PVC resin slurry is supplied. The vapor rises through the openings within the slurry tray countercurrent to the PVC resin slurry flowing down through the openings. The vapor is preferably steam, but air or another suitable vapor that can remove vinyl chloride monomer from PVC resin slurry can be used and will be known to those skilled in the art.

Solids that are contained within the PVC resin slurry are removed by allowing the solids retained at the bottom of the weir to continuously flow downward through the plate tower through a plurality of holes located within a weir of each slurry tray. The solids continually travel down the tower until the solids reach the tower bottom. In addition to the solids flowing through the weir holes, a portion of a minimum downcomer flow that is required to prevent flooding upon each slurry tray also flows through the weir holes.

BRIEF DESCRIPTION OF THE DRAWINGS

FIG. 4 is a cross-sectional view, or plan view, of a tower in accordance with the present invention, illustrating the structure of the evenly numbered trays;

FIG. 5 is a front view, or elevational view, of the evenly numbered trays illustrated in FIG. 4;

While the invention will be described in connection with the preferred embodiment, it will be understood that it is not intended to limit the invention to that embodiment. On the contrary, it is intended to cover all alternatives, modifications, and equivalents, as can be included within the spirit and scope of the invention as defined by the appended claims.

DETAILED DESCRIPTION OF THE INVENTION AND SPECIFIC EMBODIMENTS

Figure 1:
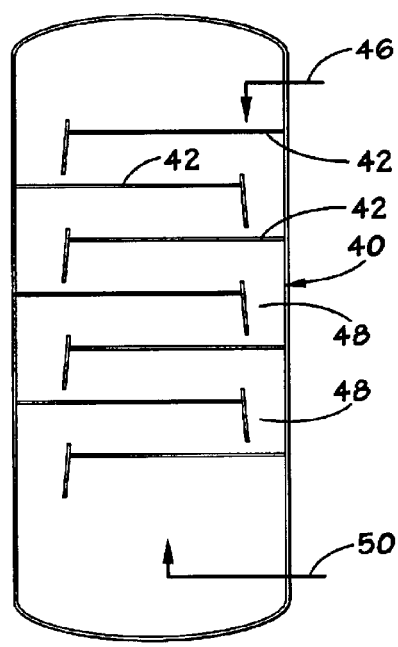
FIG. 1 is a diagrammatic drawing of the general arrangement of slurry trays in a gas-liquid contact tower, or fractionation tower, in accordance with the prior art.

With reference to FIG. 1, in schematic form, the basic environment of slurry trays is being shown in the context of a vertical tower 40, wherein a plurality of substantially, horizontally disposed slurry trays 42 are mounted therein and vertically spaced from each other. The slurry, or PVC slurry, is fed into the uppermost tray by a supply line 46. Downcomers, or downcomer passages, 48 lead from the downstream ends of each of the trays 42 to the upstream end of the next lower tray. Openings, as will be hereinafter described, are preferably formed in the trays 42 so that air, steam, or another vapor or gas, introduced into the lower end of the tower 40 from a vapor supply line 50 will ascend through the tower 40. The tower 40 can have a vapor outlet disposed at its upper end, as well as a liquid outlet at its lower end. The use of the slurry trays in connection with tower 40 is intended to cover not only fractionation towers, but structures similarly called distillation columns, plate towers, and similar structures.

Figure 2:
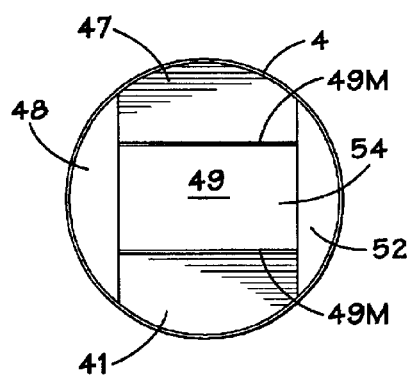
FIG. 2 is a diagrammatic view of the tower of FIG. 1.
Figure 3:
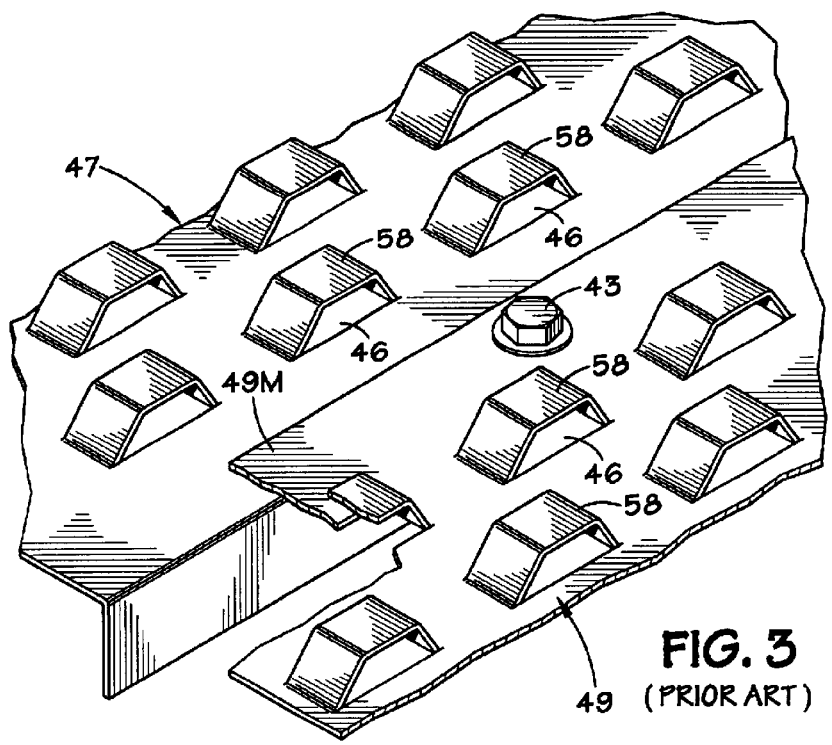
FIG. 3 is a perspective view showing a group of openings in a tray in accordance with the prior art.
Figure 6:
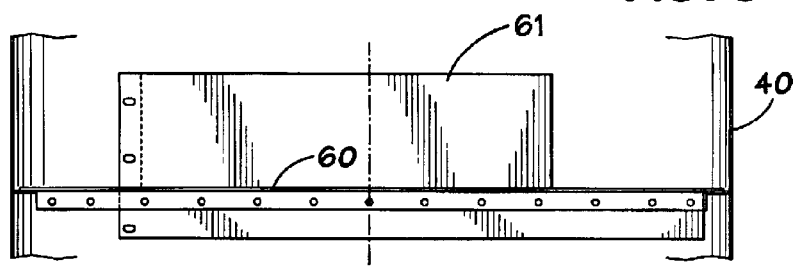
FIG. 6 is a partial cross-sectional view taken along arrows A—A of FIG. 4.
Figure 7:
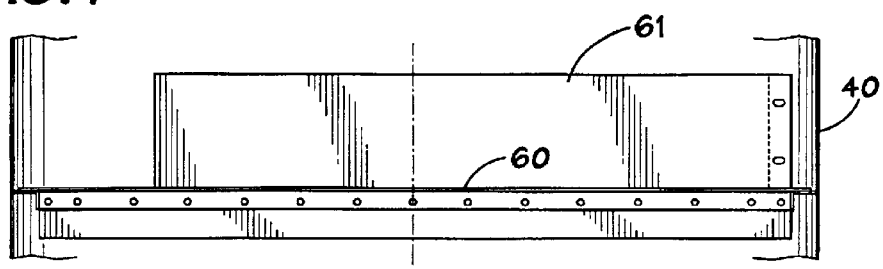
FIG. 7 is a partial cross-sectional view taken along arrows B—B of FIG. 4.
Figure 8:
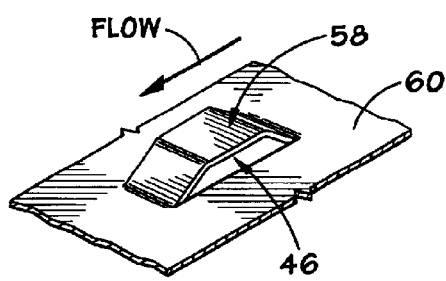
FIG. 8 is a perspective view of a typical valve disposed in a tray in accordance with the present invention.
Figure 9A:
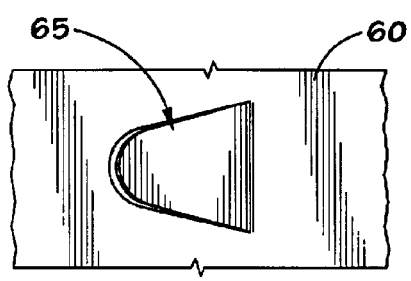
FIG. 9A is a top view of a mini-jet tab.
Figure 9B:
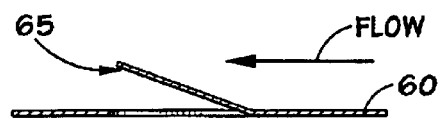
FIG. 9B is a side view of the mini-jet tab of FIG. 9A.
Figure 10:
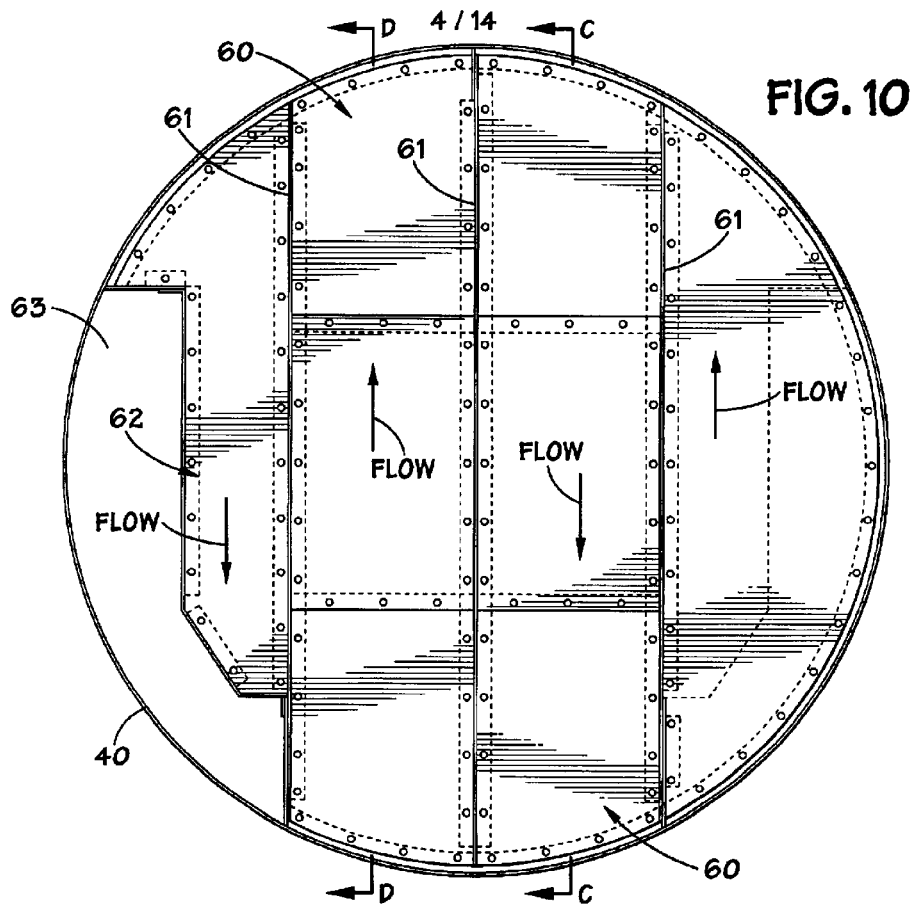
FIG. 10 is a partial cross-sectional view of a tower in accordance with the present invention for the odd numbered trays.
Figure 11:
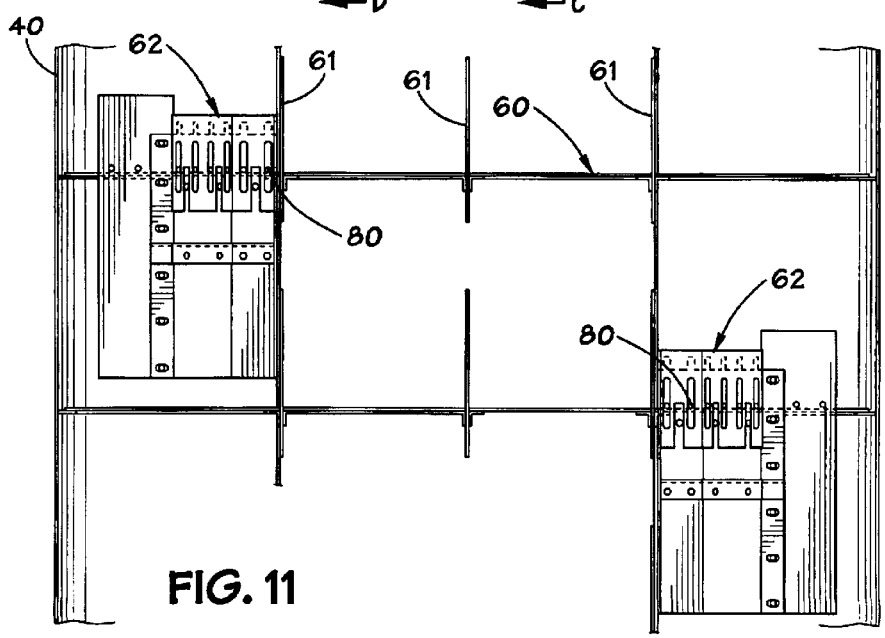
FIG. 11 is a front view, or elevational view, of the odd numbered trays illustrated in FIG. 10.
Figure 12:
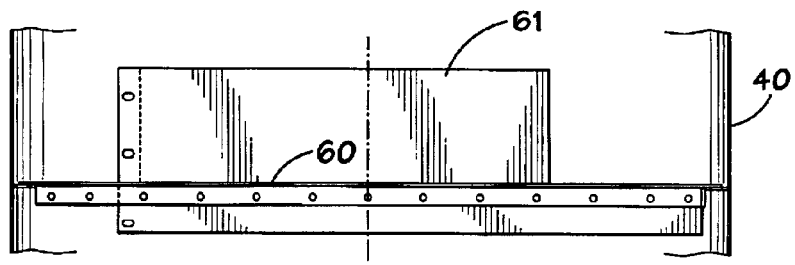
FIG. 12 is a partial cross-sectional view taken along arrow D—D of FIG. 10.
Figure 13:
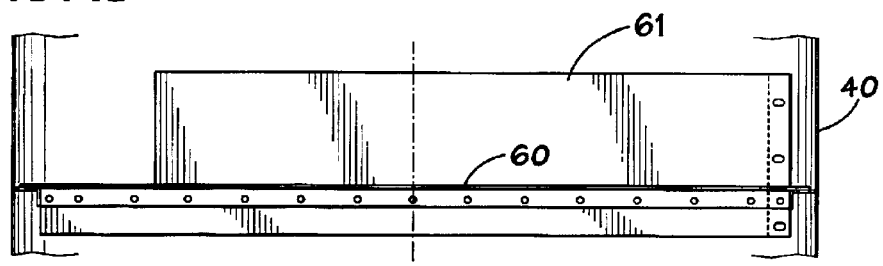
FIG. 13 is a partial cross-sectional view taken along arrow C—C of FIG. 10.
Figure 14:
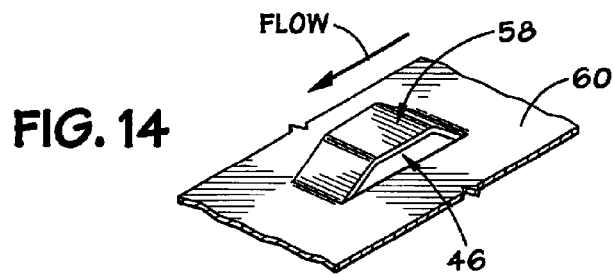
FIG. 14 is a perspective view of a valve used in the trays of the present invention.
Figure 15A:
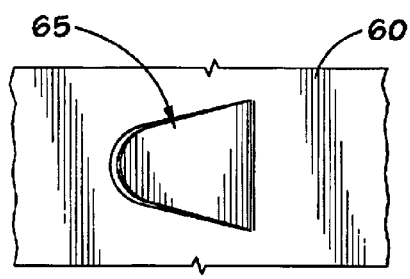
FIG. 15A is a top view of the mini-jet tab used in the trays of the present invention.
Figure 15B:
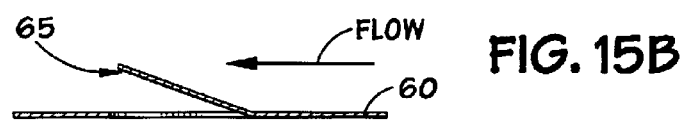
FIG. 15B is a front view of a mini-jet tab of FIG. 15A.
Figure 16:
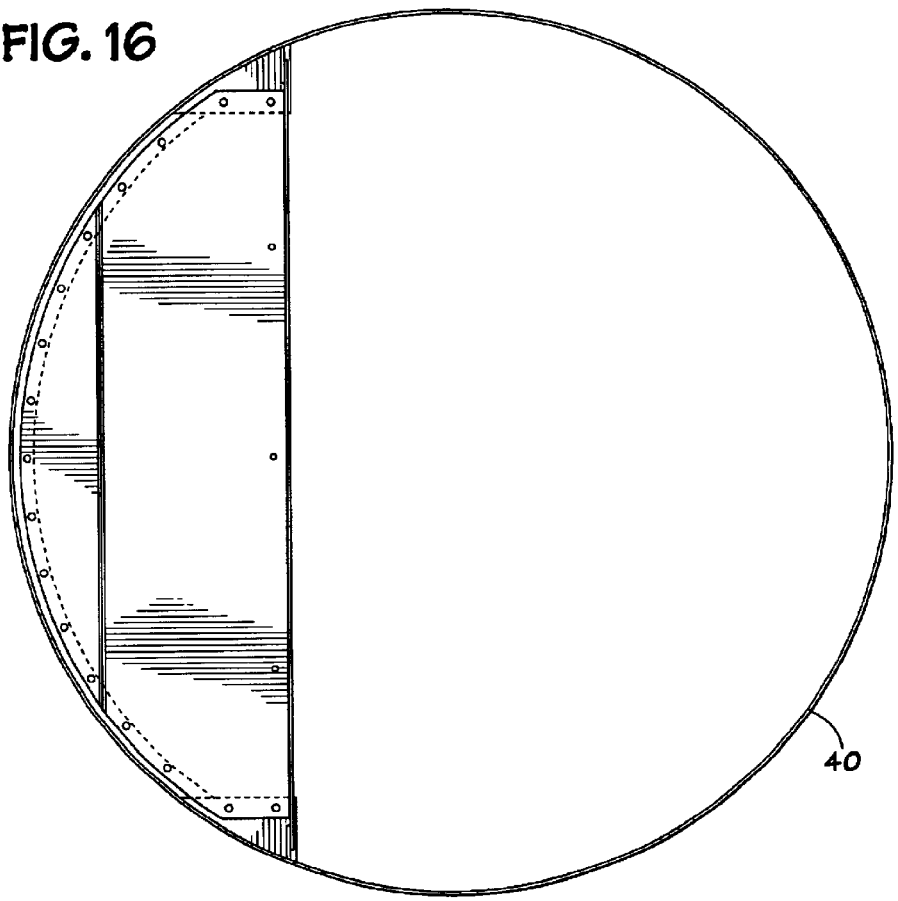
FIG. 16 is a partial cross-sectional view of tower in accordance with the present invention, illustrating a seal pan disposed below the lowermost tray, or tray no. 1.
Figure 17:
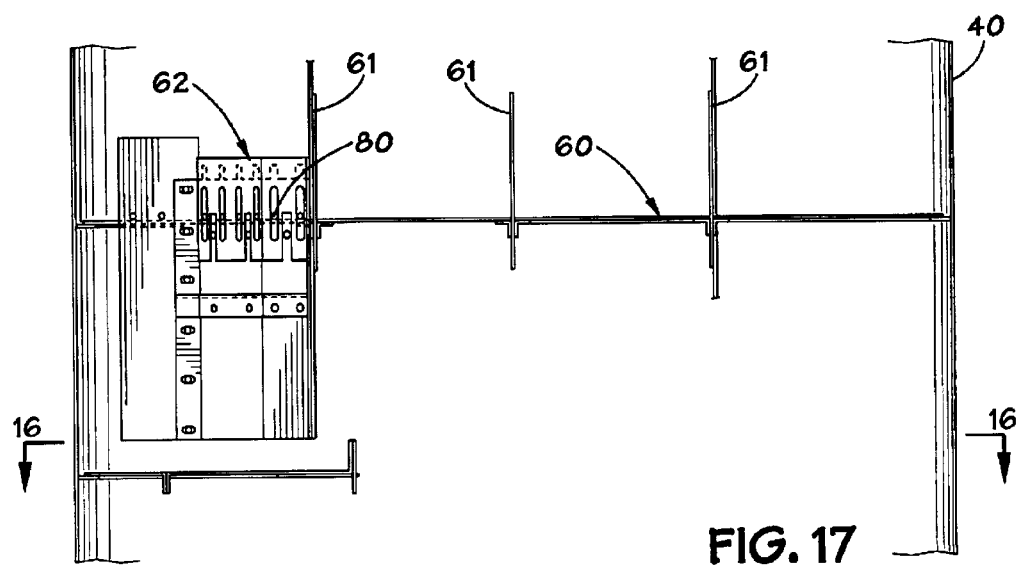
FIG. 17 is a front view, or elevational view, of the lowermost tray, or tray no. 1.
Figure 18:
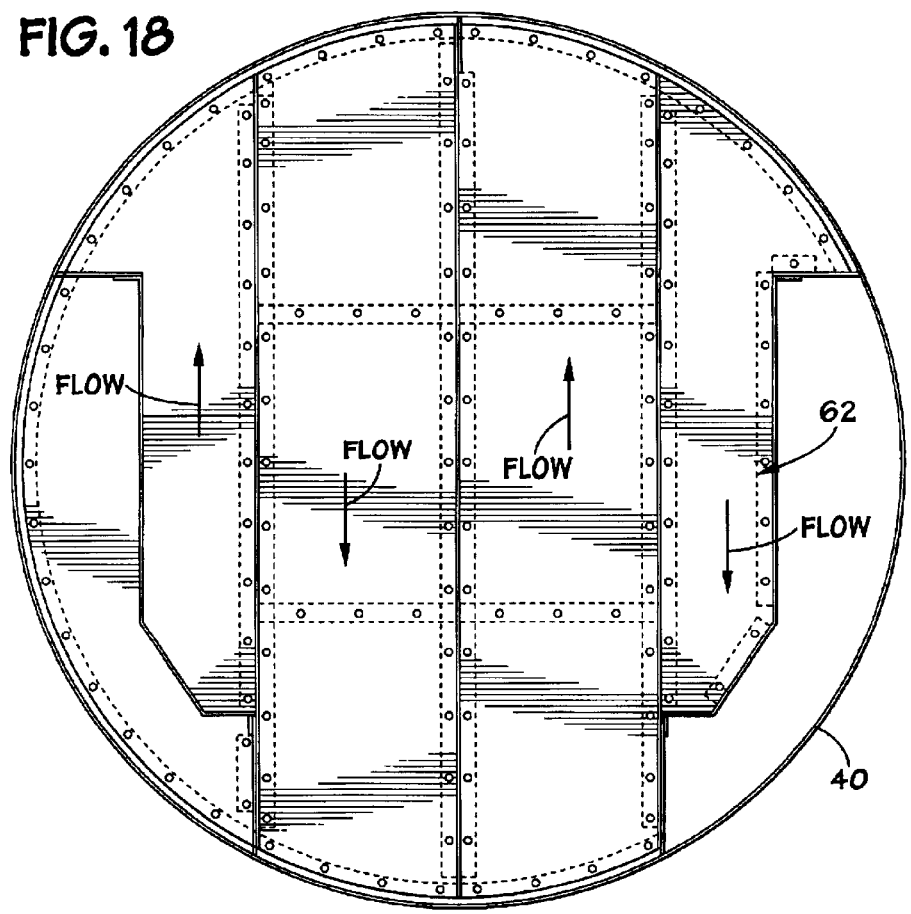
FIG. 18 is a partial cross-sectional view of a tower in accordance with the present invention, illustrating the construction of the tower above the topmost tray, or tray no. 20.
Figure 19:
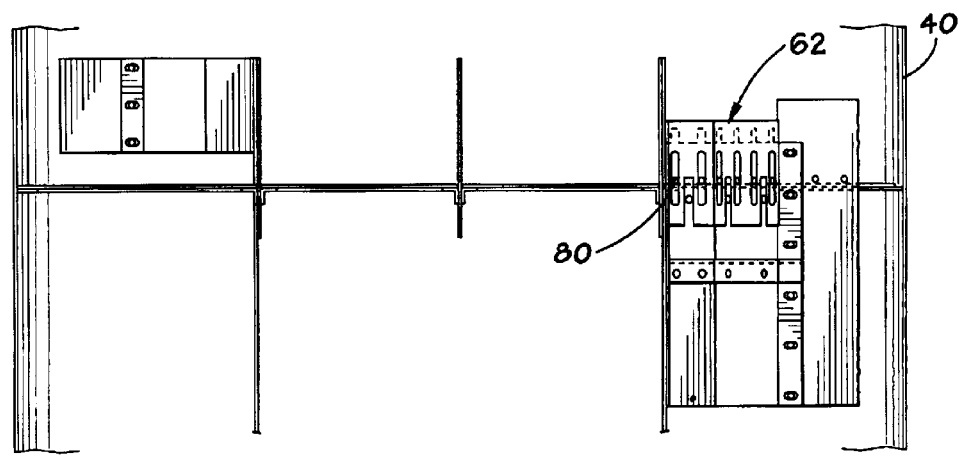
FIG. 19 is a front, or elevational view, of the construction of the tower above the topmost tray, or tray no. 20.

With reference to FIG. 2, trays in accordance with the prior art can be provided with an imperforated upstream portion 52 that receives slurry from a downcomer 48 and thus redirects the flurry flow to an active area 54 that can be provided with openings therein. With reference to FIGS. 2 and 3, it is seen that a slurry tray can be formed of a plurality of panels 47, 49, and 41. The panels 47 and 49 can be connected by bolts 43, and a margin 49M of panel 49 can overlay the adjacent panel 47. Panels 47 and 49 can have a plurality of apertures, or openings 46 disposed therein, the apertures 46 having overlying deflectors 58. The apertures 46 can have a trapezoidal shape, or they can have other shapes.

With reference to FIGS. 4–28, the slurry trays 60 of the present invention, for use in a tower 40, are illustrated. The slurry tray 60 of the present invention includes a plurality of substantially vertically disposed baffles 61, a weir 62, and a downcomer, or downcomer passageway, 63. The slurry, or PVC slurry, flows in the direction shown by the arrows designated as "FLOW" as shown in FIGS. 4, 10, 14, 18, 20, 24, 25, and 26. The trays 60 are preferably provided with valves, or apertures, 46 and overlying deflectors 58, as shown in FIGS. 8, 14, 24, 25, 26, and 27.

As shown in the foregoing figures, the valves, or directional valves, 48 on the tray, 60 are always pointed in the direction of flow, in order to prevent and keep any solid particles (not shown) in suspension. The valves used in the V-GRID trays by Sulzer Chemtech Ltd. with a business location at 1605 S. Battleground Road, La Porte, Tex. 77571 are fixed valves that are a suitable choice for use as directional valves 48. The trays 60 can also be provided with mini-jet tabs 65, as shown in FIGS. 9A, 9B, 15A, and 15B, and as further shown in FIGS. 24–26. As previously described, the mini-jet tabs 65 provide additional "push", or velocity, in certain areas or low velocity areas of trays 60. As shown in FIGS. 5, 11, and 26–28, the weirs of 62 of the various trays 60 are vertically adjustable in height by use of forming the weir 62 of the two plate members 70, 71, and providing cooperating slots 72 in the plate members 71 as particularly shown in FIG. 28. The two plate members 70, 71 can be fixed in a desired disposition, or height, as by tightening nuts and bolts 73, 74.

It should be noted that in one embodiment of the invention, it is intended to provide for twenty trays 60 disposed within a tower 40, wherein there are even numbered trays 2, 4, etc., and ten odd numbered trays 1, 3, etc., as referenced in the FIGS. In connection with FIGS. 4-28, in the embodiment of twenty trays 60, the trays are numbered beginning with the lowermost tray, or tray no. 1, to the topmost tray, or tray no. 20. However, the number of trays can be varied depending upon the separation requirements of the process and are to be considered within the scope of the present invention.

Figure 20:
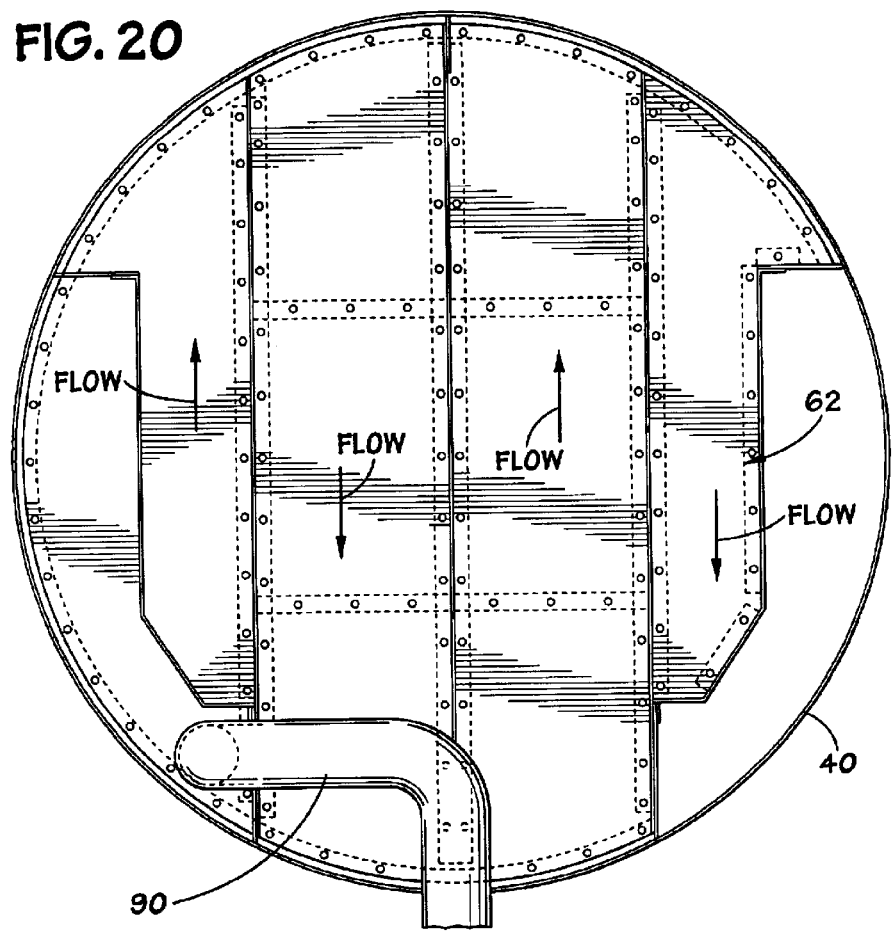
FIG. 20 is a partial cross-sectional view of a tower in accordance with the present invention illustrating the feed pipe disposed above the topmost tray, or tray no. 20.
Figure 21:
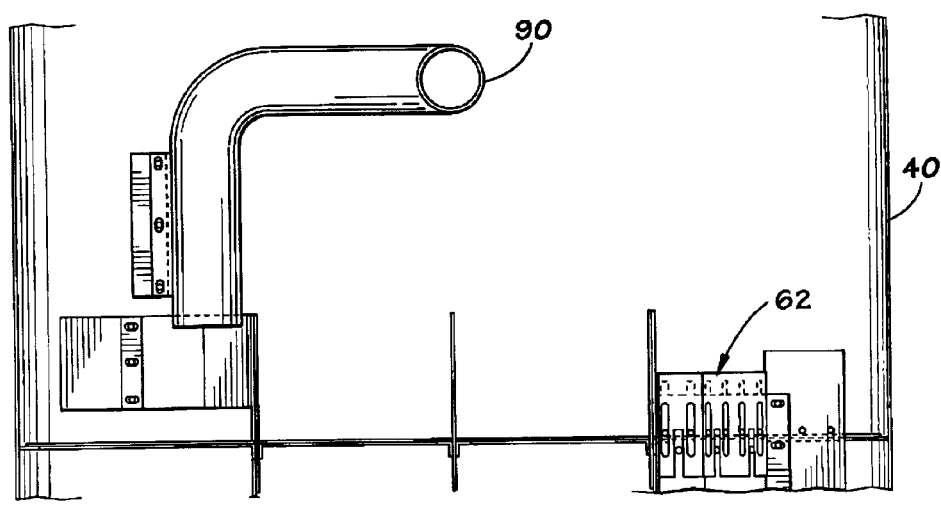
FIG. 21 is a front, or elevational view, of the feed pipe disposed above the topmost tray, or tray no. 20.
Figure 22:
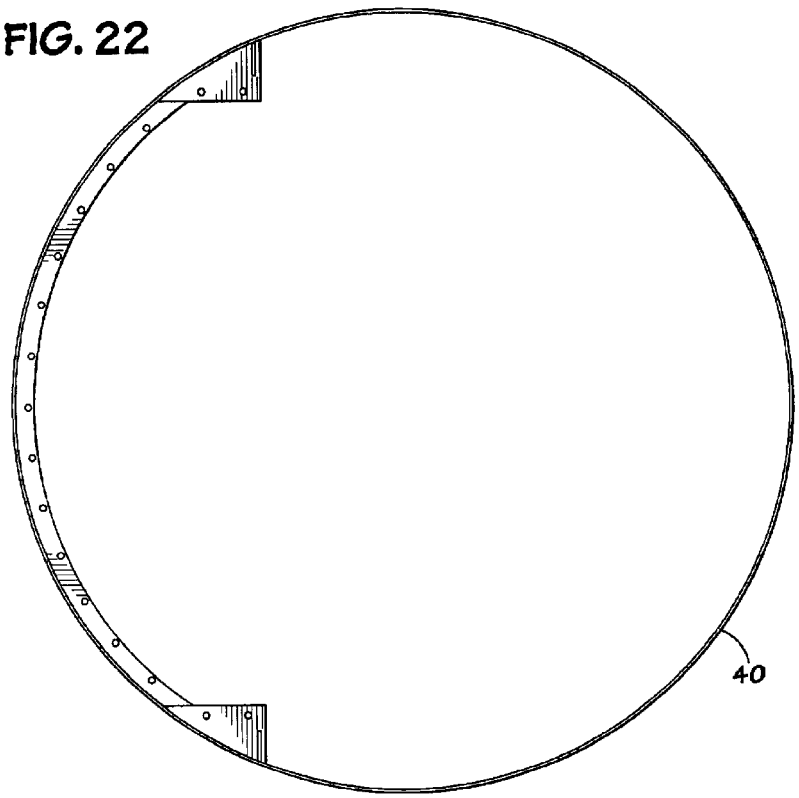
FIG. 22 is a partial cross-sectional view of a tower in accordance with the present invention illustrating the seal pan disposed below the lowermost tray, or tray no. 1.
Figure 23:
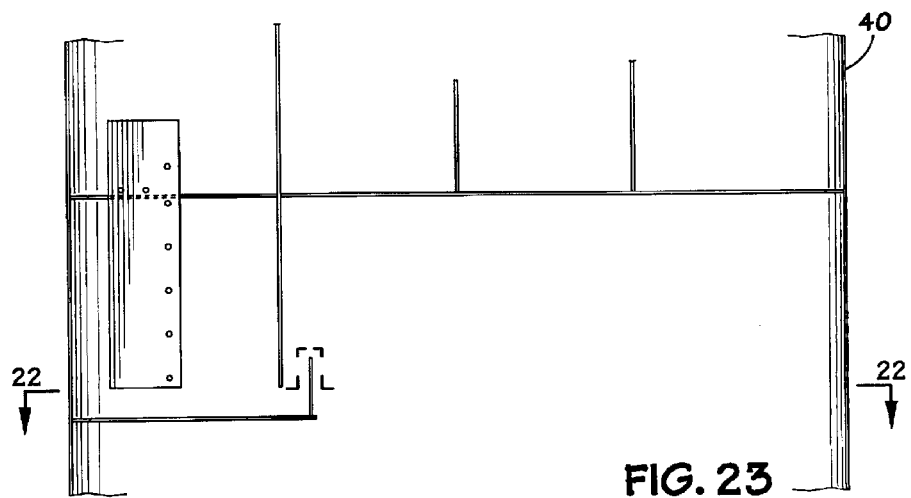
FIG. 23 is a side, or elevational, view of the lowermost tray, or tray no. 1.
Figure 24:
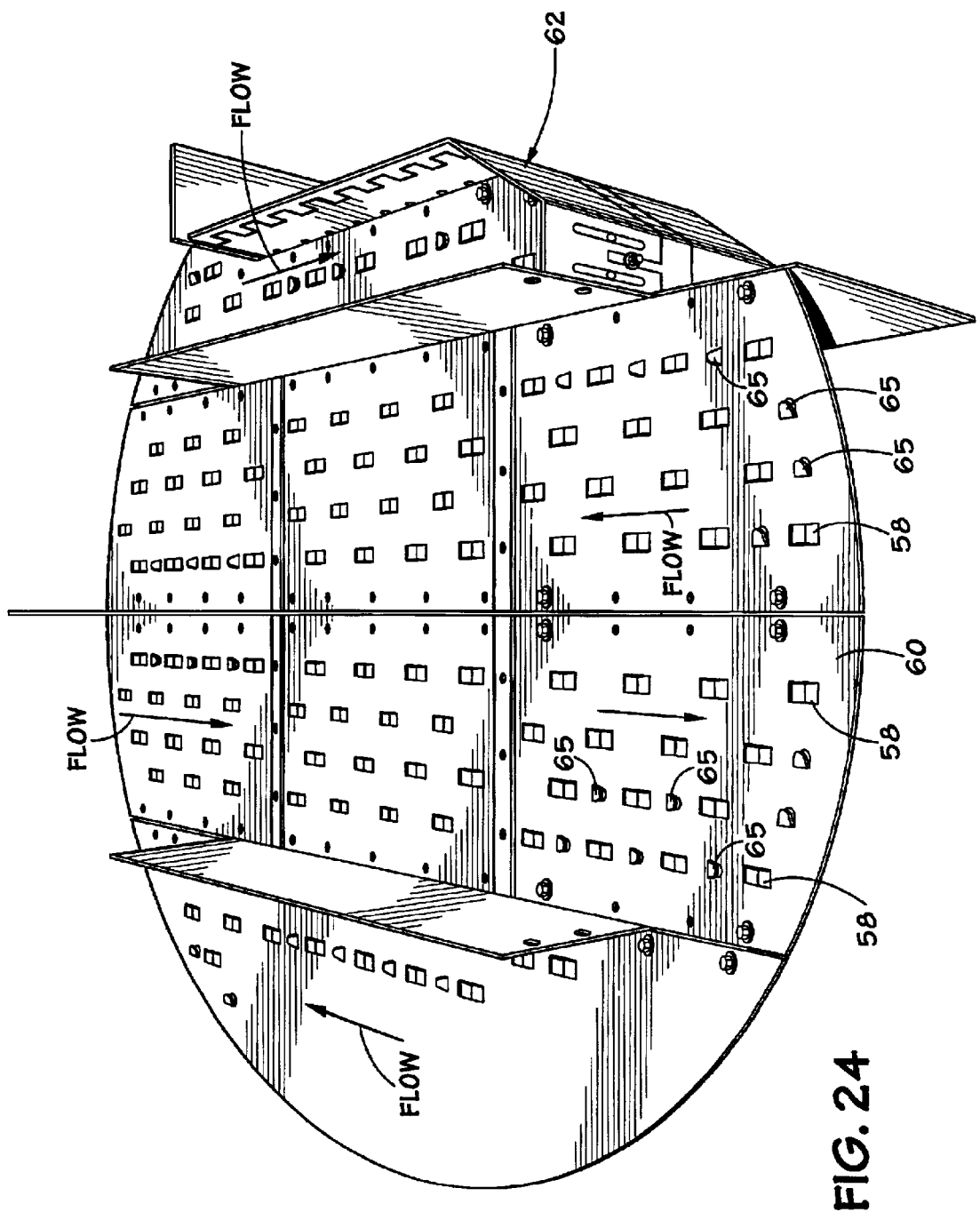
FIG. 24 is a perspective view of a tray in accordance with the present invention corresponding to FIG. 4.
Figure 25:
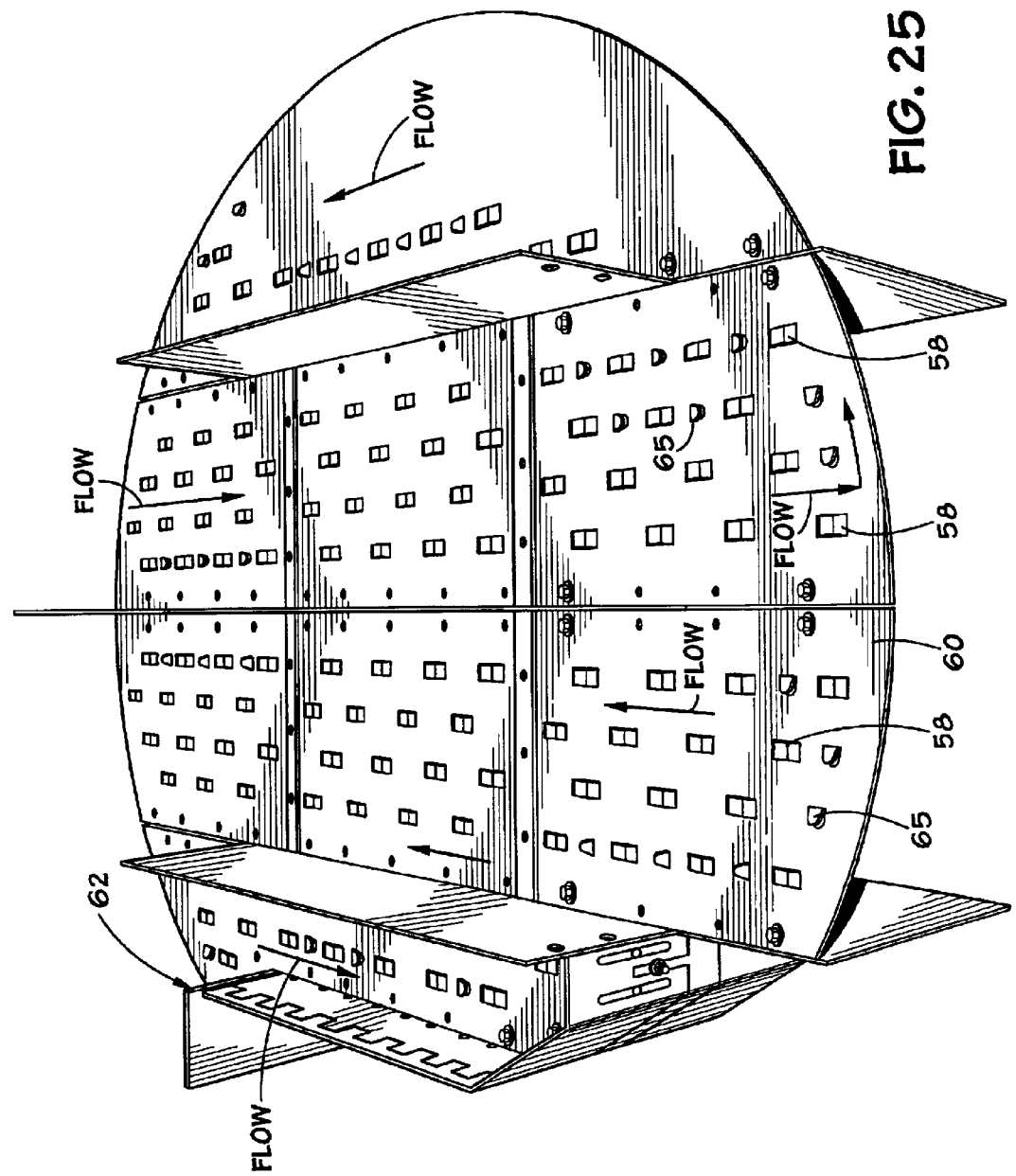
FIG. 25 is a perspective view of a tray in accordance with the present invention corresponding to that shown in FIG. 10.
Figure 26:
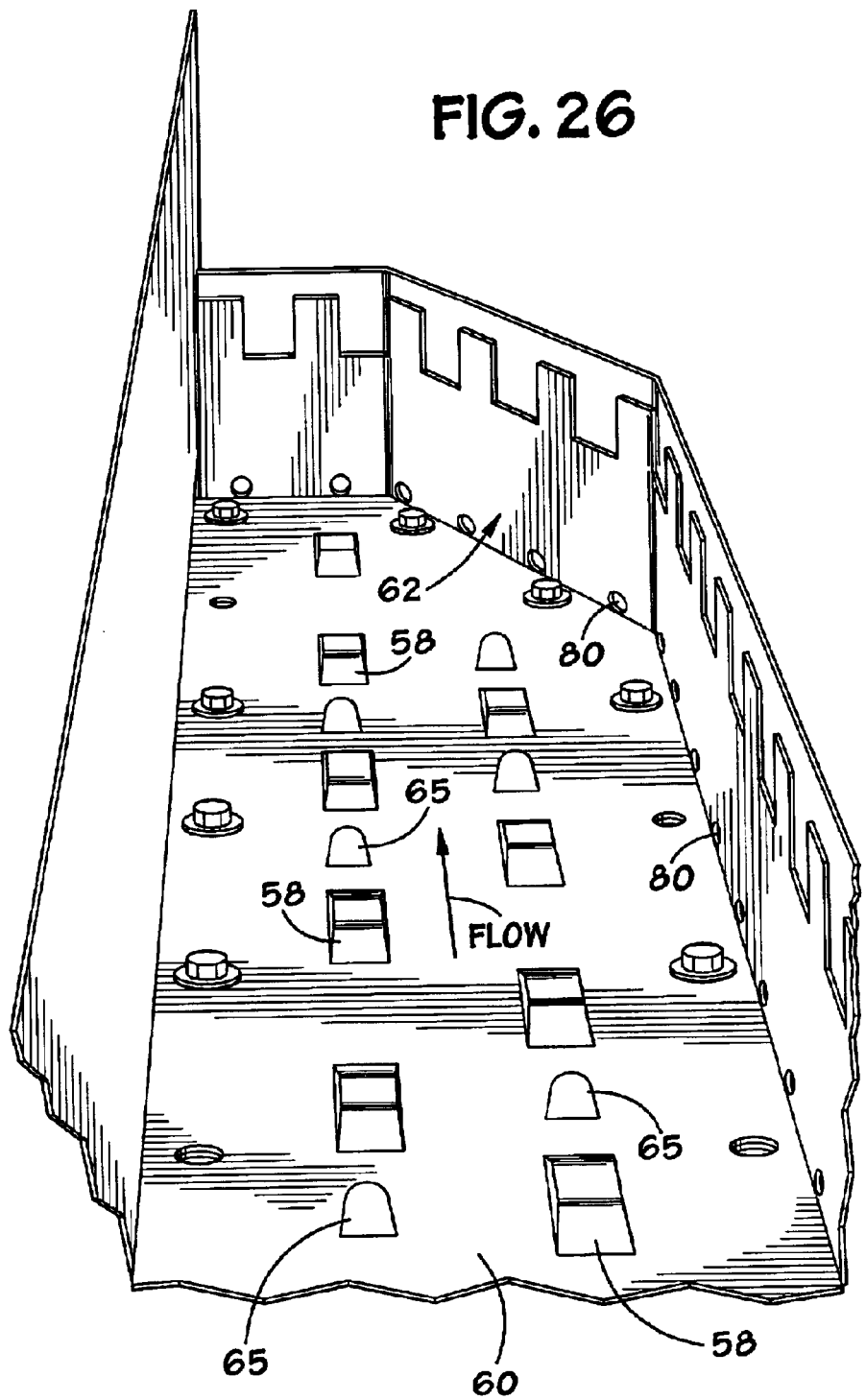
FIG. 26 is a perspective view of a portion of the weir of the slurry tray of FIG. 10.
Figure 27:
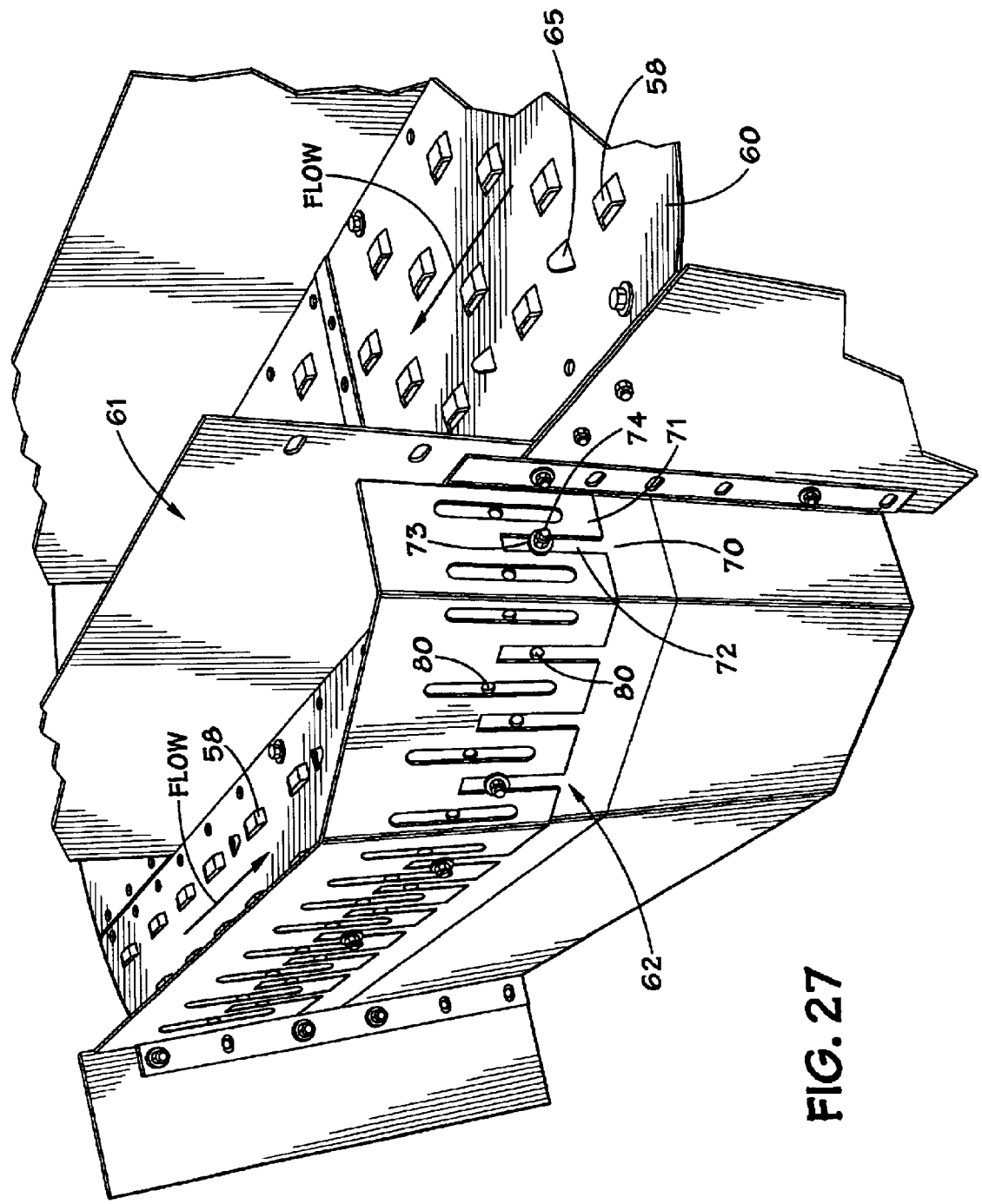
FIG. 27 is a perspective view of a portion of the tray and weir of FIG. 10.
Figure 28:
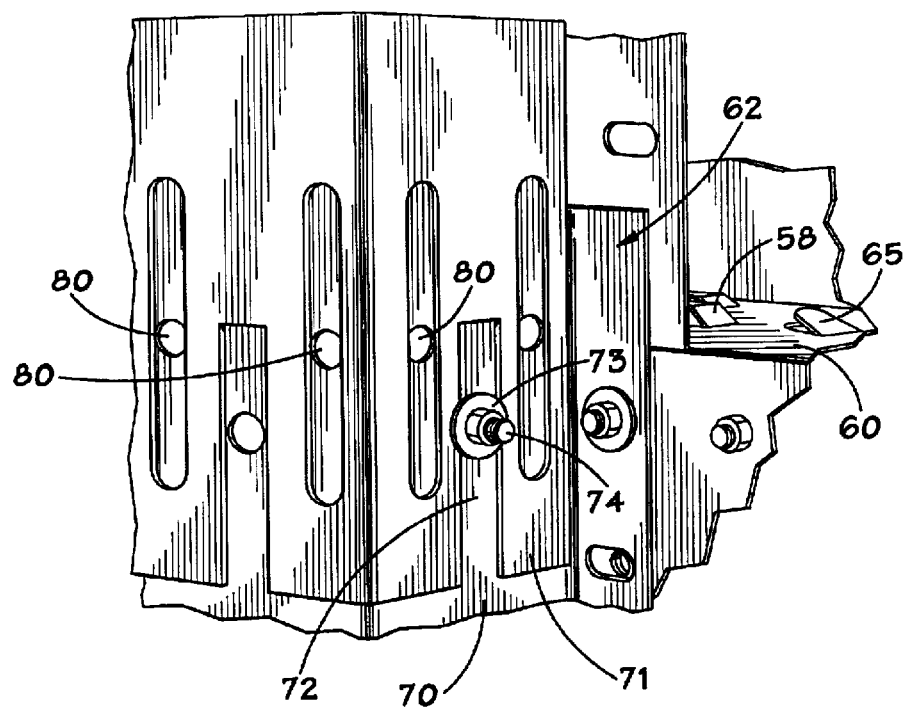
FIG. 28 is a front view of a portion of the weir of the trays in accordance with the present invention.

The openings 80 in weirs 62 are best illustrated in FIGS. 26–28. The feed pipe 90 is illustrated in FIGS. 20 and 21.

The present invention also advantageously provides a method of removing residual vinyl chloride monomer from a PVC resin slurry so that the PVC resin is not discolored. The method generally includes supplying a PVC resin slurry to a slurry tray 42 in a plate tower 40. The PVC resin slurry is allowed to flow through partitioned channels downwardly through a plurality of openings 46 within the slurry tray 42 and a downcomer 63 of the slurry tray 42 to a next slurry tray 42. The PVC resin slurry preferably travels at a velocity greater than that required to maintain solids contained within the polyvinylchloride resin slurry in liquid suspension. The openings 46 within the slurry tray 42 can be provided with valves 46, as described herein.

A vapor stream is also supplied to the plate tower 40 preferably at a lower feed location than the PVC resin slurry is supplied. The vapor rises through the openings 46 within the slurry tray 42 countercurrent to the PVC resin slurry flowing down through the openings 46. The vapor is preferably steam, but air or another suitable vapor or gas that can remove vinyl chloride monomer from PVC resin slurry can be used and will be known to those skilled in the art.

Solids that are contained within the PVC resin slurry are removed by allowing the solids retained at the bottom of a weir 62 to continuously flow downward through the plate tower through a plurality of openings 80 located within the weir 62 of each slurry tray 42. The solids continually travel down the tower 40 until the solids reach the tower bottom. In addition to the solids flowing through the weir openings 80, a portion of a minimum downcomer flow that is required to prevent flooding upon each slurry tray 42 also flows through the weir openings 80.

As an advantage of the present invention, the trays can be used in most existing distillation column configurations without much modification to the support plate or other interior features of the column. As an additional advantage, the trays can be used with other compounds with a solids concentration of up to 35%. This is particularly advantageous since most distillation column trays do not work efficiently and require frequent cleaning when materials with such a high solids concentration are processed within the fractionation column.

It is to be understood that the invention is not limited to the exact details of construction, operation, exact materials, or embodiments shown and described, as obvious modifications and equivalents will be apparent to one skilled in the art. Accordingly, the invention is therefore to be limited only by the scope of the appended claims.

What is claimed is:

1. A slurry tray for removing residual vinyl chloride monomer from a polyvinylchloride resin slurry with reduced discoloration of the polyvinylchloride resin in a plate tower, the slurry tray comprising:

at least one channel formed upon the slurry tray that allows the polyvinylchloride resin slurry to flow along a top surface of the slurry tray;

at least one baffle disposed upon the slurry tray that separates each channel and guides the polyvinylchloride resin slurry to flow in the channel at a velocity greater than about one foot per second to maintain solids contained within the polyvinylchloride resin slurry in liquid suspension;

at least one downcomer to direct the polyvinylchloride resin slurry to the next slurry tray and to prevent flooding on each slurry tray, the at least one downcomer being void of any dead spaces thereby ensuring plug flow through the at least one downcomer;

at least one weir including at least one hole to allow solids trapped at the bottom of the weir to flow continuously downward to a bottom of the plate tower and to allow a portion of a minimum flow required to prevent flooding on the slurry tray to flow into the downcomer and down to the next slurry tray, the downcomer providing a minimum space between the at least one weir and a wall of the plate tower so that a large enough volume and weir length exists to provide a sufficient volume of polyvinylchloride resin slurry to pass through the downcomer to maintain solids contained within the polyvinylchloride resin slurry in liquid suspension; and a plurality of openings disposed upon the slurry tray to allow the polyvinylchloride resin slurry to flow down the plate tower and to allow a second warmer material to rise upward through the plate tower countercurrently contacting the polyvinylchloride resin slurry flowing down the plate tower.

2. The slurry tray of claim 1, wherein the openings comprise a plurality of directional valves.

3. A slurry tray for removing residual vinyl chloride monomer from a polyvinylchloride resin slurry with reduced discoloration of the polyvinylchloride resin in a plate tower, the slurry tray comprising:

at least one channel formed upon the slurry tray that allows the polyvinylchloride resin slurry to flow along a top surface of the slurry tray;

at least one baffle disposed upon the slurry tray that separates each channel and guides the polyvinylchloride resin slurry to flow in the channel at a velocity greater than about one foot per second to maintain solids contained within the polyvinylchloride resin slurry in liquid suspension;

at least one downcomer to direct the polyvinylchloride resin slurry to the next slurry tray and to prevent flooding on each slurry tray;

at least one weir including at least one hole to allow solids trapped at the bottom of the weir to flow continuously downward to a bottom of the plate tower and to allow a portion of a minimum flow required to prevent flooding on the slurry tray to flow into the downcomer and down to the next slurry tray; and a plurality of openings disposed upon the slurry tray to allow the polyvinylchloride resin slurry to flow down the plate tower and to allow a second warmer material to rise upward through the plate tower countercurrently contacting the polyvinylchloride resin slurry flowing down the plate tower, the openings comprising a plurality directional valves positioned to assist in keeping the solids in suspension by aligning the directional valves in a same flow direction as the polyvinylchloride resin slurry.

4. The slurry tray of claim 1, wherein the weir has an adjustable height.

5. The slurry tray of claim 1, further comprising a plurality of mini jet tabs disposed upon each slurry tray.

6. The slurry tray of claim 1, wherein each component of the slurry tray is sized so that the slurry tray can be used to remove residual vinyl chloride monomer from a polyvinylchloride resin slurry comprising up to about 35 wt. % solids.

7. The slurry tray of claim 1, wherein the at least one hole in the weir is sized to allow one quarter of the minimum flow to prevent flooding on the slurry tray to flow into the downcomer.

8. A plate tower for removing residual vinyl chloride monomer from a polyvinylchloride resin slurry with reduced discoloration of the polyvinylchloride resin, the plate tower comprising:

a feed nozzle placed within the plate tower so that when the polyvinylchloride resin slurry is supplied to the feed nozzle, the polyvinylchloride resin slurry begins flowing in a downcomer of a slurry tray and flows to an outlet of the downcomer; and a plurality of slurry trays below the feed nozzle and adapted to fit within the plate tower, each slurry tray comprising:

at least one channel formed upon the slurry tray that allows the polyvinylchloride resin slurry to flow along a top surface of the slurry tray;

at least one baffle disposed upon the slurry tray that separates each channel and guides the polyvinylchloride resin slurry to flow in the channel at a velocity greater than about one foot per second to maintain solids contained within the polyvinylchloride resin slurry in liquid suspension;

at least one downcomer to direct the polyvinylchloride resin slurry to the next slurry tray and to prevent flooding on each slurry tray, the at least one downcomer being void of any dead spaces thereby ensuring plug flow through the at least one downcomer and the feed nozzle being positioned within the plate tower to supply polyvinylchloride resin slurry so that there are not dead spots in the at least one downcomer;

at least one weir comprising at least one hole to allow solids trapped at the bottom of the weir to flow continuously downward to a bottom of the plate tower and to allow a portion of a minimum flow required to prevent flooding on the slurry tray to flow into the downcomer and down to the next slurry tray, the downcomer providing a minimum space between the at least one weir and a wall of the plate tower so that a large enough volume and weir length exists to provide a sufficient volume of polyvinylchloride resin slurry to pass through the downcomer to maintain solids contained within the polyvinylchloride resin slurry in liquid suspension; and a plurality of openings disposed upon each slurry tray to allow the polyvinylchloride resin slurry to flow down the plate tower and to allow a second warmer material to rise upward through the plate tower countercurrently contacting the polyvinylchloride resin slurry flowing down the plate tower.

9. The plate tower of claim 8, wherein the openings comprise a plurality of directional valves.

10. A plate tower for removing residual vinyl chloride monomer from a polyvinylchloride resin slurry with reduced discoloration of the polyvinylchloride resin, the plate tower comprising:

a feed nozzle placed within the plate tower so that when the polyvinylchloride resin slurry is supplied to the feed nozzle, the polyvinylchloride resin slurry begins flowing in a downcomer of a slurry tray and flows to an outlet of the downcomer; and a plurality of slurry trays below the feed nozzle and adapted to fit within the plate tower, each slurry tray comprising:

at least one channel formed upon the slurry tray that allows the polyvinylchloride resin slurry to flow along a top surface of the slurry tray;

at least one baffle disposed upon the slurry tray that separates each channel and guides the polyvinylchloride resin slurry to flow in the channel at a velocity greater than about one foot per second to maintain solids contained within the polyvinylchloride resin slurry in liquid suspension;

at least one downcomer to direct the polyvinylchloride resin slurry to the next slurry tray and to prevent flooding on each slurry tray;

at least one weir comprising at least one hole to allow solids trapped at the bottom of the weir to flow continuously downward to a bottom of the plate tower and to allow a portion of a minimum flow required to prevent flooding on the slurry tray to flow into the downcomer and down to the next slurry tray; and a plurality of openings disposed upon each slurry tray to allow the polyvinylchloride resin slurry to flow down the plate tower and to allow a second warmer material to rise upward through the plate tower countercurrently contacting the polyvinylchloride resin slurry flowing down the plate tower, the openings comprising a plurality of directional valves positioned to assist in keeping the solids in suspension by aligning the directional valves in a same flow direction as the polyvinylchloride resin slurry.

11. The plate tower of claim 8, wherein the weir has an adjustable height.

12. The plate tower of claim 8, further comprising mini jet tabs disposed upon the slurry tray.

13. The plate tower of claim 8 wherein each component of the slurry tray is sized so that the slurry tray can be used to remove residual vinyl chloride monomer from a polyvinylchloride resin slurry comprising up to about 35 wt. % solids.

14. The plate tower of claim 8, wherein the at least one hole in the weir is sized to allow one quarter of the minimum flow to prevent flooding on the slurry tray to flow into the downcomer.

15. A method of removing residual vinyl chloride monomer from a polyvinylchloride resin slurry with reduced discoloration of the polyvinylchloride resin, the method comprising the steps of:

supplying a polyvinylchloride resin slurry to a slurry tray using a feed nozzle located within a plate tower so that there are no dead spots in a downcomer located within the slurry tray and allowing the polyvinylchloride resin slurry to flow through partitioned channels downwardly through a plurality of openings disposed upon the slurry tray and a downcomer of the slurry tray to a next slurry tray at a velocity greater than about one foot per second to maintain solids contained within the polyvinylchloride resin slurry in liquid suspension;

supplying a vapor to the plate tower at a lower feed location than the polyvinylchloride resin slurry is supplied so that the vapor rises through the openings within the slurry tray countercurrent to the polyvinylchloride resin slurry flowing down through the openings; and removing solids within the polyvinylchloride resin slurry by allowing the solids retained at the bottom of the weir to continuously flow downward through the plate tower through a plurality of holes located within a weir of each slurry tray until the solids reach a bottom of the plate tower, the solids flow through the holes along with a portion of a minimum flow into the downcomer that is required to prevent flooding upon each slurry tray, the downcomer being void of any dead spaces thereby ensuring plug flow through the downcomer and providing a minimum space between the weir and a wall of the plate tower so that a large enough volume and weir length exists to provide a sufficient volume of polyvinylchloride resin slurry to pass through the downcomer to maintain solids contained within the polyvinylchloride resin slurry in liquid suspension.

16. The method of claim 15, wherein allowing the polyvinylchloride resin slurry to flow through the openings within the slurry tray includes utilizing a plurality of directional valves.

17. The method of claim 16, wherein utilizing the directional valves includes positioning the directional valves to assist in keeping the solids in suspension by aligning the directional valves in a same flow direction as the polyvinylchloride resin slurry.

18. The method of claim 16, wherein removing solids within the polyvinylchloride resin slurry by allowing the solids retained at the bottom of the weir to continuously flow downward through the plate tower through a plurality of holes located within a weir includes utilizing a weir having an adjustable height.

19. The method of claim 16, further comprising utilizing a plurality of mini jet tabs to increase the velocity of the polyvinylchloride resin slurry flowing downwardly through the plate tower.

20. The method of claim 16, wherein supplying a polyvinylchloride resin slurry includes using a polyvinylchloride resin slurry comprising up to about 35 wt. % solids.

21. The method of claim 16, wherein the solids are allowed to continuously flow downward through a plurality of holes located within each weir, along with about one quarter of the minimum flow to the downcomer that is required to prevent flooding upon each slurry tray.

* * * * *